(12) United States Patent
Otaka et al.

(10) Patent No.: US 11,641,571 B2
(45) Date of Patent: May 2, 2023

(54) COMMUNICATION DEVICE, COMMUNICATION METHOD, NON-TRANSITORY COMPUTER-READABLE STORAGE MEDIUM STORING COMMUNICATION PROGRAM, AND VEHICLE

(71) Applicant: HONDA MOTOR CO., LTD., Tokyo (JP)

(72) Inventors: Masaru Otaka, Wako (JP); Ryusuke Tamanaha, Wako (JP); Shohei Tsukahara, Wako (JP); Ryo Saiki, Wako (JP); Yusuke Oi, Tokyo (JP); Takahiro Iijima, Tokyo (JP); Naoko Imai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 17/197,967

(22) Filed: Mar. 10, 2021

(65) Prior Publication Data
US 2021/0297831 A1 Sep. 23, 2021

(30) Foreign Application Priority Data
Mar. 18, 2020 (JP) .............................. JP2020-048139

(51) Int. Cl.
*H04W 4/46* (2018.01)
*H04W 40/22* (2009.01)
(Continued)

(52) U.S. Cl.
CPC .............. *H04W 4/46* (2018.02); *H04W 4/44* (2018.02); *H04W 4/80* (2018.02); *H04W 40/22* (2013.01)

(58) Field of Classification Search
None
See application file for complete search history.

(56) References Cited

U.S. PATENT DOCUMENTS

2016/0019110 A1\* 1/2016 Mosko ..................... H04L 45/28
714/57
2016/0029243 A1\* 1/2016 Seino ..................... H04L 47/125
455/552.1
(Continued)

FOREIGN PATENT DOCUMENTS

| EP | 2903224 A1 \* | 8/2015 | ........... H04L 65/605 |
| JP | 2016-25505 A | 2/2016 | |
| JP | 2019-62295 A | 4/2019 | |

*Primary Examiner* — Rebecca E Song
(74) *Attorney, Agent, or Firm* — Rankin, Hill & Clark LLP (57) ABSTRACT

A TCU includes: a wide-area communication section that performs wireless communication with a base station; a short-range communication section that performs wireless communication with an access point; a vehicle-to-vehicle communication section that performs wireless communication with a relay vehicle; and a communication control section that transmits upload data by using any one of the wide-area communication section, the short-range communication section, and the vehicle-to-vehicle communication section, wherein the communication control section transmits the upload data more preferentially by using the short-range communication section or the vehicle-to-vehicle communication section than by using the wide-area communication section when an upload deferment condition is met, and transmits the upload data more preferentially by using the wide-area communication section than by using the short-range communication section and the vehicle-to-vehicle communication section when the upload deferment condition is not met.

11 Claims, 6 Drawing Sheets

(51) Int. Cl.
*H04W 4/80* (2018.01)
*H04W 4/44* (2018.01)

(56) References Cited

U.S. PATENT DOCUMENTS

| | | | |
|---|---|---|---|
| 2016/0057803 A1* | 2/2016 | Kim | H04W 52/0209 370/329 |
| 2018/0376307 A1* | 12/2018 | Itatsu | H04L 63/107 |
| 2019/0320055 A1* | 10/2019 | Barros | H04M 1/72505 |
| 2020/0128375 A1* | 4/2020 | Shahmurad | H04W 4/48 |
| 2020/0229065 A1* | 7/2020 | Iwata | H04W 4/44 |

* cited by examiner

$$\text{DEGREE OF PRIORITY} = \left| \frac{1}{\text{NUMBER OF REMAINING VEHICLES ALLOWED TO RELAY} \times \alpha(\text{COEFFICIENT}) \times \frac{\text{REMAINING FREE CAPACITY}}{\text{USED CAPACITY}}} \right|$$

COMMUNICATION DEVICE, COMMUNICATION METHOD, NON-TRANSITORY COMPUTER-READABLE STORAGE MEDIUM STORING COMMUNICATION PROGRAM, AND VEHICLE

INCORPORATION BY REFERENCE

The present application claims priority under 35 U.S.C. § 119 to Japanese Patent Application No. 2020-048139 filed on Mar. 18, 2020. The content of the application is incorporated herein by reference in its entirety.

BACKGROUND OF THE INVENTION

Field of the Invention

The present invention relates to a communication device, a communication method, a non-transitory computer-readable storage medium storing a communication program, and a vehicle.

Description of the Related Art

Conventionally, a technique has been known in which a device provided in a vehicle transmits data to a server.

For example, Japanese Patent Laid-Open No. 2016-025505 discloses an in-vehicle terminal device that includes: a cellular communication section that communicates with a base station; and a wireless LAN communication section that communicates with an access point covering a shorter range than the base station, wherein data is transmitted to a server by using the wireless LAN communication section when a long transmission time period is allowed for the data, and data is transmitted to the server by using the cellular communication section when a short transmission time period is allowed for the data.

Moreover, for example, Japanese Patent Laid-Open No. 2019-062295 discloses an in-vehicle device that transmits data to a server via one or more devices provided in one or more other vehicles.

However, according to a configuration in which all data for which a short transmission time period is allowed is transmitted via a base station as in Japanese Patent Laid-Open No. 2016-025505, a data volume communicated with the base station increases, so that expense rises on cellular communication, for which higher communication costs are incurred than for short-range communication such as wireless LAN. When data is transmitted to a server via a device provided in another vehicle as in Japanese Patent Laid-Open No. 2019-062295, the data cannot be transmitted to the server within an allowed transmission time period in some cases if there are an increased number of devices in vehicles through which the data passes.

Accordingly, an object of the present invention is to enable data upload from a vehicle to a server to be carried out quickly while an increase in a data volume communicated with a base station is restrained.

SUMMARY OF THE INVENTION

An aspect that achieves the above object is a communication device used in a subject vehicle, the communication device including: a wide-area communication section that performs wireless communication with a base station within a first communication area; a short-range communication section that performs wireless communication with an access point within a second communication area that has a shorter range than the first communication area; a vehicle-to-vehicle communication section that performs wireless communication with a relay vehicle other than the subject vehicle; and a communication control section that transmits, by using any one of the wide-area communication section, the short-range communication section, and the vehicle-to-vehicle communication section, upload data for which a predetermined server is specified as an upload destination, wherein the communication control section transmits the upload data more preferentially by using the short-range communication section or the vehicle-to-vehicle communication section than by using the wide-area communication section when a predetermined upload deferment condition is met with respect to the upload data, and transmits the upload data more preferentially by using the wide-area communication section than by using the short-range communication section and the vehicle-to-vehicle communication section when the upload deferment condition is not met.

The communication device may further include a memory that stores the upload data, and may be configured such that the communication control section transmits the upload data stored in the memory by using any one of the wide-area communication section, the short-range communication section, and the vehicle-to-vehicle communication section, and after the transmission, deletes the upload data from the memory.

The communication device may be configured such that even when the upload deferment condition is met, the communication control section transmits the upload data more preferentially by using the wide-area communication section than by using the short-range communication section and the vehicle-to-vehicle communication section when a remaining free capacity of the memory is equal to or smaller than a predetermined capacity.

The communication device may be configured such that the number of remaining vehicles allowed to relay is added to the upload data, the number of remaining vehicles allowed to relay indicating the number of the remaining relay vehicles through which the upload data is allowed to pass before arriving at the predetermined server, the communication control section decrements the number of remaining vehicles allowed to relay added to the upload data when the upload data is transmitted by using the vehicle-to-vehicle communication section, and the upload deferment condition is that the number of remaining vehicles allowed to relay is equal to or larger than a predetermined number.

The communication device may be configured such that time limit information is added to the upload data, the time limit information indicating a time limit for arrival of the upload data at the predetermined server, and the upload deferment condition is that the time limit for arrival indicated by the time limit information added to the upload data has not passed.

The communication device may further include a communication quality acquisition section that acquires a communication quality of the short-range communication section, and may be configured such that the upload deferment condition is that the communication quality acquired by the communication quality acquisition section is equal to or higher than a predetermined quality, and the communication control section transmits the upload data by using the short-range communication section when the communication quality acquired by the communication quality acquisition section is equal to or higher than the predetermined quality.

The communication device may be configured such that when the upload data is transmitted by using the wide-area communication section, the communication control section adds identification information on a contractor to the upload data and transmits the upload data, the contractor signing a contract for communication performed by using the wide-area communication section.

The communication device may be configured such that when there are a plurality of pieces of the upload data to be transmitted by using the wide-area communication section, the communication control section transmits the plurality of pieces of the upload data in ascending order of data volume.

The communication device may further include an area acquisition section that acquires a position of the second communication area, and may be configured such that the communication control section transmits the upload data, by using the vehicle-to-vehicle communication section, to the relay vehicle traveling toward the position of the second communication area acquired by the area acquisition section.

Another aspect that achieves the above object is a communication method performed by a communication device used in a subject vehicle, the communication device including: a wide-area communication section that performs wireless communication with a base station within a first communication area; a short-range communication section that performs wireless communication with an access point within a second communication area that has a shorter range than the first communication area; and a vehicle-to-vehicle communication section that performs wireless communication with a relay vehicle other than the subject vehicle, the communication method including: when a predetermined upload deferment condition is met with respect to upload data for which a predetermined server is specified as an upload destination, transmitting the upload data more preferentially by using the short-range communication section or the vehicle-to-vehicle communication section than by using the wide-area communication section, and when the upload deferment condition is not met, transmitting the upload data more preferentially by using the wide-area communication section than by using the short-range communication section and the vehicle-to-vehicle communication section.

Still another aspect that achieves the above object is a communication program for a communication device used in a subject vehicle, the communication device including: a wide-area communication section that performs wireless communication with a base station within a first communication area; a short-range communication section that performs wireless communication with an access point within a second communication area that has a shorter range than the first communication area; and a vehicle-to-vehicle communication section that performs wireless communication with a relay vehicle other than the subject vehicle, the communication program causing a control section of the communication device to function as a communication control section that, when a predetermined upload deferment condition is met with respect to upload data for which a predetermined server is specified as an upload destination, transmits the upload data more preferentially by using the short-range communication section or the vehicle-to-vehicle communication section than by using the wide-area communication section, and when the upload deferment condition is not met, transmits the upload data more preferentially by using the wide-area communication section than by using the short-range communication section and the vehicle-to-vehicle communication section.

Further another aspect that achieves the above object is a vehicle including the communication device.

The aspects of the present invention enable data upload from a vehicle to a server to be carried out quickly while an increase in a data volume communicated with a base station is restrained.

DETAILED DESCRIPTION OF THE PREFERRED EMBODIMENT

Figure 1:
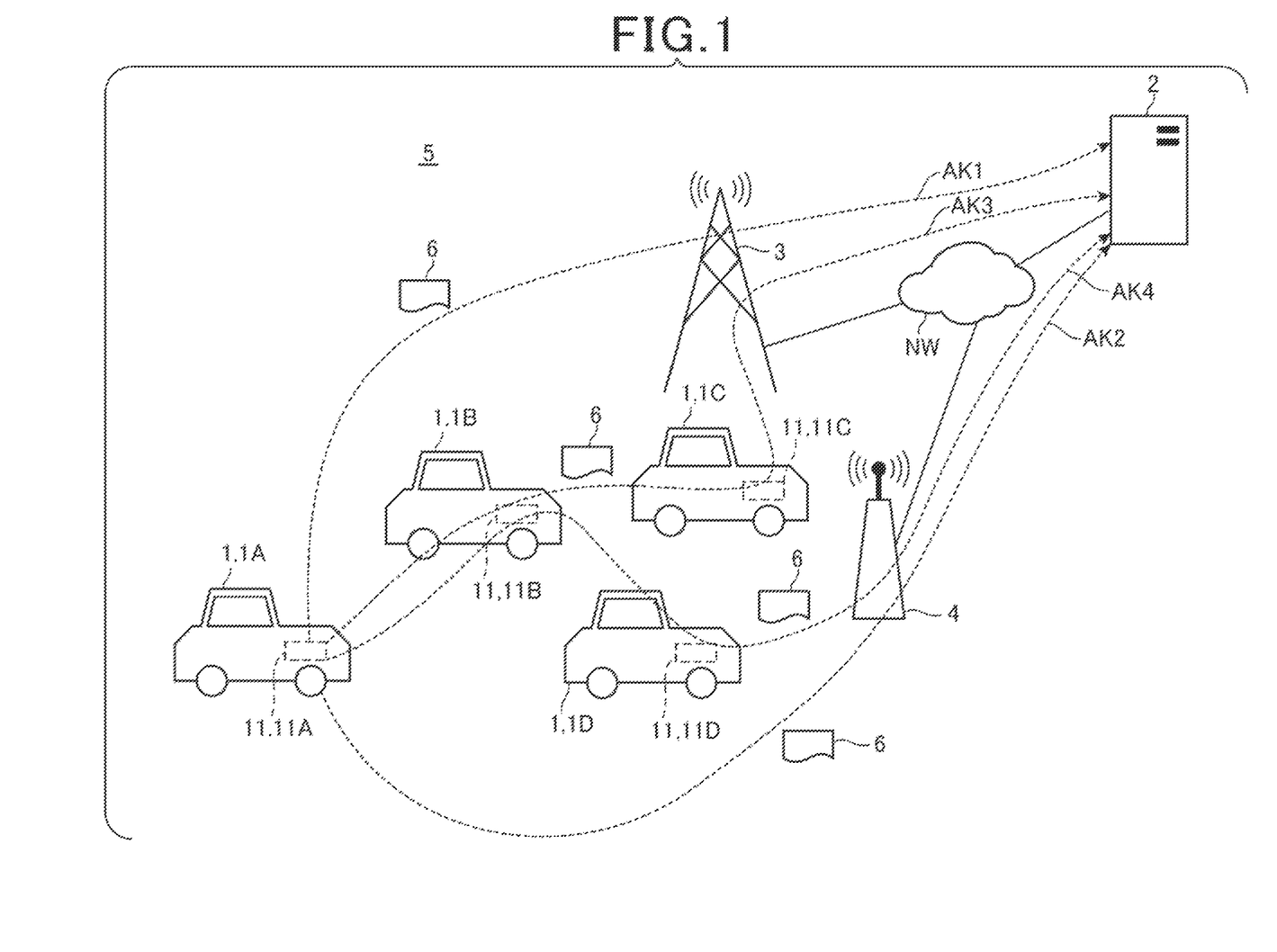
FIG. 1 shows a configuration of a communication system.

FIG. 1 shows a configuration of a communication system 5.

The communication system 5 includes vehicles 1 and an information processing server 2 capable of communicating with the vehicles 1 through a network NW. The information processing server 2 corresponds to a predetermined server in the present invention. The network NW includes the Internet, a telephone network, and another communication network.

A vehicle 1 in the present embodiment includes a telemetry control unit (TCU) 11, and the TCU 11 uploads data to the information processing server 2, via any of a base station 3 connected to the network NW, an access point 4 connected to the network NW, and a TCU 11 included in another vehicle 1. The TCU 11 corresponds to a communication device of the present invention.

Examples of the data uploaded from the vehicle 1 to the information processing server 2 include moving image data on an accident, image data on a parking lot, and the like. In a description below, data for which the information processing server 2 is specified as an upload destination will be referred to as "upload data" and denoted with a reference numeral "6".

The information processing server 2 is a server apparatus that receives upload data 6 from a vehicle 1 and performs various information processing, such as management of the received upload data 6, analysis of the received upload data 6, and distribution of information based on the received upload data 6. Note that although the information processing server 2 is represented by one block in the drawings, such representation does not necessarily mean that the information processing server 2 includes a single server apparatus. For example, the information processing server 2 may include a plurality of server apparatuses for different processing contents.

As described above, the base station 3 and the access point 4 are connected to the network NW to which the information processing server 2 is connected.

The base station 3 performs wireless communication with a device that is present in an area where wireless communication with the base station 3 is possible, and relays transmission and reception of data between the device and the information processing server 2. In a description below, the area where wireless communication with the base station 3 is possible will be referred to as "base station coverage area". The base station coverage area corresponds to a first communication area in the present invention. Wireless communication with the base station 3 is enabled by an owner or the like of a vehicle 1 signing a contract related to wireless communication with the base station 3. In the present embodiment, costs on communication with the base station 3 are greater than costs on communication with the access point 4.

The access point 4 performs wireless communication with a device that is present in an area where wireless communication with the access point 4 is possible, and relays transmission and reception of data between the device and the information processing server 2. In a description below, the area where wireless communication with the access point 4 is possible will be referred to as "access point coverage area". The access point coverage area corresponds to a second communication area in the present invention. The access point coverage area has a shorter range than the base station coverage area.

Upload data 6 transmitted from a vehicle 1 that is a source of the upload data 6 arrives at the information processing server 2 through any one of a first path AK1, a second path AK2, a third path AK3, and a fourth path AK4.

The first path AK1 is a path starting from the vehicle 1 that is the source of the upload data 6, and arriving at the information processing server 2 via the base station 3, without passing through any vehicle 1 other than the source vehicle 1.

The first path AK1 in FIG. 1 illustrates a path in a case where the upload data 6 arrives at the information processing server 2 from a vehicle 1A that is the source of the upload data 6 via the base station 3, without passing through vehicles 1B, 1C, 1D.

The second path AK2 is a path starting from the vehicle 1 that is the source of the upload data 6, and arriving at the information processing server 2 via the access point 4, without passing through any vehicle 1 other than the source vehicle 1.

The second path AK2 in FIG. 1 illustrates a path in a case where the upload data 6 arrives at the information processing server 2 from the vehicle 1A that is the source of the upload data 6 via the access point 4, without passing through the vehicles 1B, 1C, 1D.

The third path AK3 is a path starting from the vehicle 1 that is the source of the upload data 6, and arriving at the information processing server 2 via the base station 3, after passing through one or more vehicles 1 other than the source vehicle 1.

The third path AK3 in FIG. 1 illustrates a path in a case where the upload data 6 arrives at the information processing server 2 from the vehicle 1A that is the source of the upload data 6 via the base station 3, after passing through the vehicles 1B, 1C.

The fourth path AK4 is a path starting from the vehicle 1 that is the source of the upload data 6, and arriving at the information processing server 2 via the access point 4, after passing through one or more vehicles 1 other than the source vehicle 1.

The fourth path AK4 in FIG. 1 illustrates a path in a case where the upload data 6 arrives at the information processing server 2 from the vehicle 1A that is the source of the upload data 6 via the access point 4, after passing through the vehicles 1B, 1D.

Figure 2:
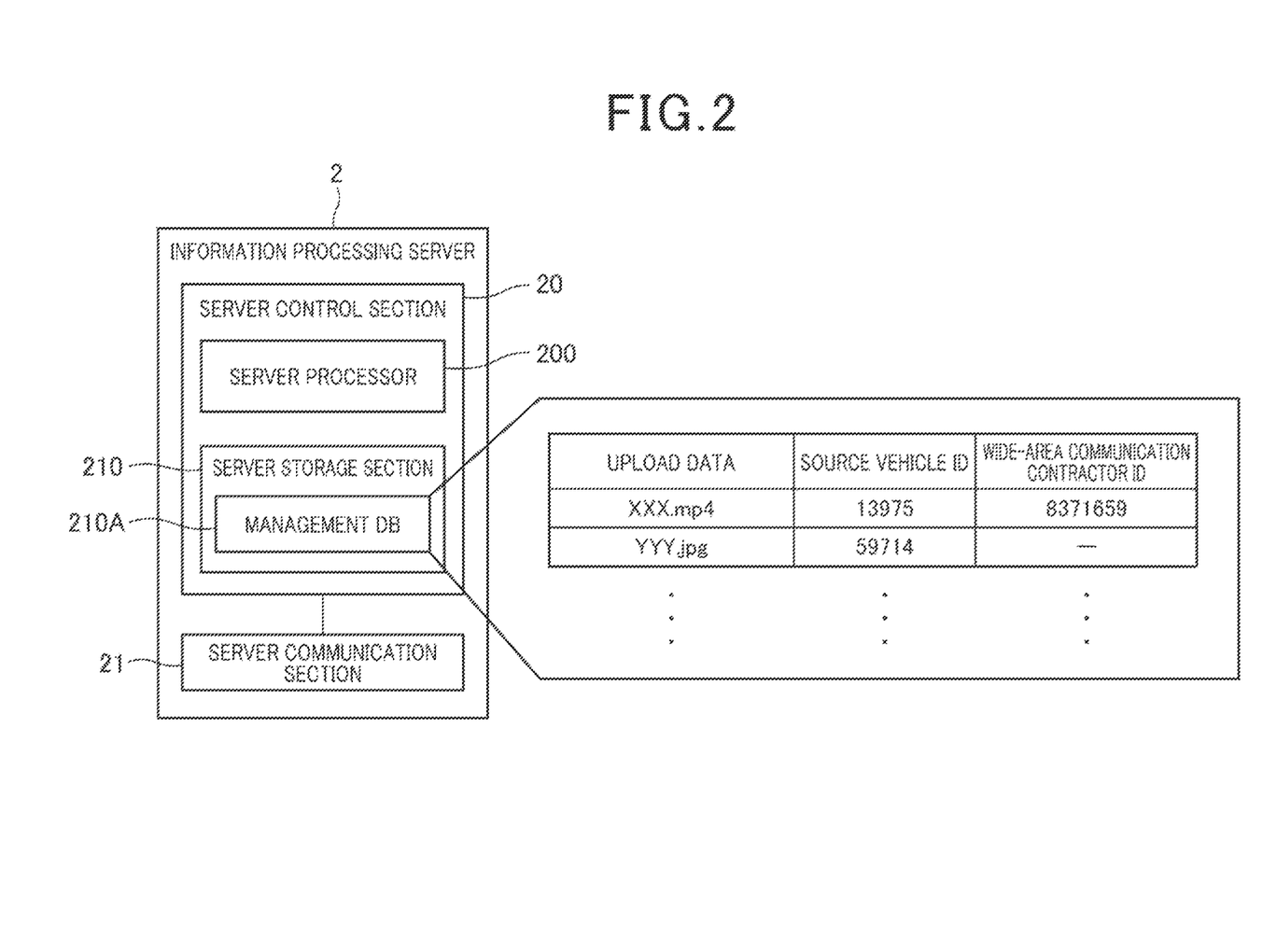
FIG. 2 shows a configuration of an information processing server.

FIG. 2 shows a configuration of the information processing server 2.

The information processing server 2 includes a server control section 20 and a server communication section 21 (receiver/transmitter).

The server control section 20 includes a server processor 200 and a server storage section 210 (memory), and controls each section of the server 2. The server processor 200 is a processor that executes a program, such as a CPU or an MPU. The server 2 performs various processing through cooperation between hardware and software in such a manner that the server processor 200 reads and executes a control program stored in the server storage section 210.

The server storage section 210 includes a storage area in which a program to be executed by the server processor 200 and data to be processed by the server processor 200 are stored. The server storage section 210 stores the control program to be executed by the server processor 200, a management DB 210A, and other various data. The server storage section 210 includes a non-volatile storage area in which a program and data are stored in a non-volatile manner. Moreover, the server storage section 210 may include a volatile storage area, to configure a work area in which a program to be executed and data to be processed by the server processor 200 are temporarily stored.

The management DB 210A is a database that manages upload data 6. A record stored in the management DB 210A includes at least upload data 6 and a source vehicle ID 1122. The source vehicle ID is identification information on a vehicle 1 that is a source of the upload data 6. A record including upload data 6 that is uploaded via the base station 3 further includes a wide-area communication contractor ID 1123, in addition to the upload data 6 and a source vehicle ID 1122. The wide-area communication contractor ID 1123 is identification information for identifying a wide-area communication contractor who signs a contract related to wireless communication with the base station 3.

The server control section 20 refers to a record stored in the management DB 210A and performs various information processing, such as analysis of upload data 6 and distribution of information based on upload data 6.

The server communication section 21 includes communication hardware complying with a predetermined communication standard, and communicates with the vehicles 1 through the network NW in accordance with control by the server control section 20.

Figure 3:
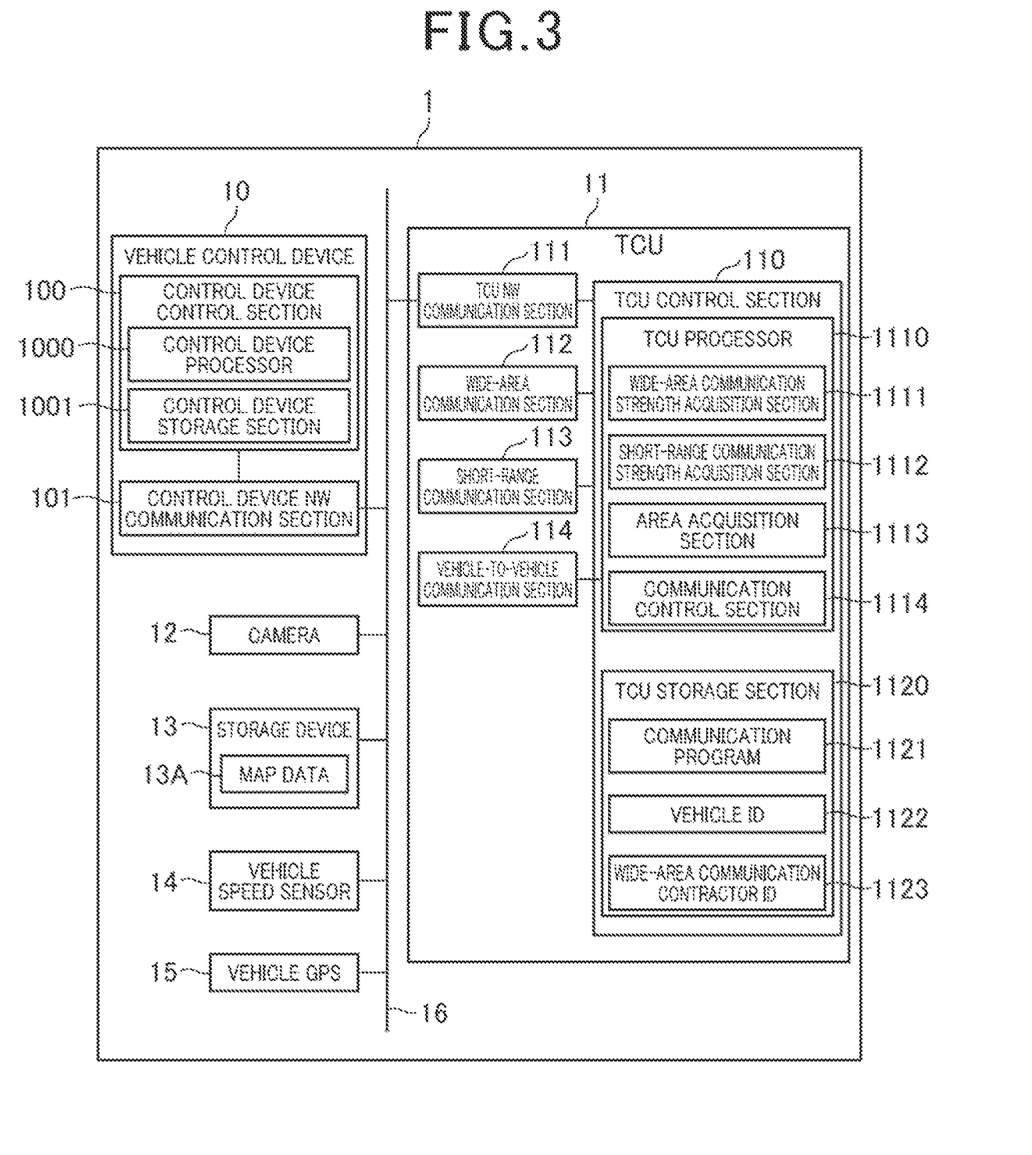
FIG. 3 shows a configuration of a vehicle.

Next, a configuration of the vehicles 1 will be described.

FIG. 3 shows a configuration of a vehicle 1.

The vehicle 1 includes a vehicle control device 10, a TCU 11, a camera 12, a storage device 13, a vehicle speed sensor 14, and a vehicle GPS 15. The vehicle control device 10, the TCU 11, the camera 12, the storage device 13, the vehicle speed sensor 14, and the vehicle GPS 15 are communicably connected to each other through an in-vehicle network 16. Here, the in-vehicle network 16 is, for example, a CAN bus complying with a CAN (Controller Area Network) communication standard.

The vehicle control device 10 includes a control device control section 100 and a control device NW communication section 101 (receiver/transmitter).

The control device control section 100 includes a control device processor 1000 and a control device storage section 1001 (memory), and controls each section of the vehicle control device 10. The control device processor 1000 is a processor that executes a program, such as a CPU or an MPU. The control device control section 100 performs various processing through cooperation between hardware and software in such a manner that the control device processor 1000 reads and executes a control program stored in the control device storage section 1001.

The control device storage section 1001 includes a storage area in which a program to be executed by the control device processor 1000 and data to be processed by the control device processor 1000 are stored. The control device storage section 1001 stores the control program to be executed by the control device processor 1000, and other various data. The control device storage section 1001 includes a non-volatile storage area in which a program and data are stored in a non-volatile manner. Moreover, the control device storage section 1001 may include a volatile storage area, to configure a work area in which a program to be executed and data to be processed by the control device processor 1000 are temporarily stored.

The control device control section 100 controls operation of the vehicle 1. For example, the control device control section 100 locks and unlocks doors of the vehicle 1 by controlling a door lock mechanism (not shown). For example, the control device control section 100 detects switching on and off of an ignition switch (not shown) and controls starting and stopping of the vehicle 1.

The control device control section 100 in the present embodiment generates upload data 6 and transmits the generated upload data 6 to the TCU 11 via the control device NW communication section 101. For example, the control device control section 100 acquires captured data from the camera 12 by controlling the camera 12, and generates image data on a parking lot, moving image data on an accident, or the like, based on the acquired captured data. The control device control section 100 may include a plurality of ECUs, processors, and/or circuits, or may be incorporated in the TCU 11.

The control device NW communication section 101 includes, for example, a CAN transceiver that performs communication complying with the CAN communication standard, and communicates with a device connected to the in-vehicle network 16 in accordance with control by the control device control section 100.

Next, a configuration of the TCU 11 will be described.

The TCU 11 includes a TCU control section 110, a TCU NW communication section 111 (receiver/transmitter), a wide-area communication section 112 (receiver/transmitter), a short-range communication section 113 (receiver/transmitter), and a vehicle-to-vehicle communication section 114 (receiver/transmitter). The TCU control section 110 corresponds to a control section in the present invention.

The TCU control section 110 includes a TCU processor 1110 and a TCU storage section 1120 (non-transitory computer-readable storage medium, memory), and controls each section of the TCU 11. The TCU processor 1110 is a processor that executes a program, such as a CPU or an MPU. The TCU control section 110 performs various processing through cooperation between hardware and software in such a manner that the TCU processor 1110 reads a control program stored in the TCU storage section 1120 and executes processing. The TCU storage section 1120 corresponds to a storage section in the present invention. The TCU processor 1110 functions as a wide-area communication strength acquisition section 1111, a short-range communication strength acquisition section 1112, an area acquisition section 1113, and a communication control section 1114, by reading and executing a communication program 1121 stored in the TCU storage section 1120. Such functional sections will be described later. The short-range communication strength acquisition section 1112 corresponds to a communication quality acquisition section in the present invention.

The TCU storage section 1120 includes a storage area in which a program to be executed by the TCU processor 1110 and data to be processed by the TCU processor 1110 are stored. The TCU storage section 1120 stores the control program to be executed by the TCU processor 1110, the communication program 1121, a vehicle ID 1122, a wide-area communication contractor ID 1123, and other various data. The TCU storage section 1120 includes a non-volatile storage area in which a program and data are stored in a non-volatile manner. Moreover, the TCU storage section 1120 may include a volatile storage area, to configure a work area in which a program to be executed and data to be processed by the TCU processor 1110 are temporarily stored.

The TCU NW communication section 111 includes, for example, a CAN transceiver that performs communication complying with the CAN communication standard, and communicates with a device connected to the in-vehicle network 16 in accordance with control by the TCU control section 110.

The wide-area communication section 112 includes communication hardware according to a cellular communication scheme such as 3G (third-generation mobile telecommunications system), 4G (fourth-generation mobile telecommunications system), LTE (Long Term Evolution), or 5G (fifth-generation mobile telecommunications system), and performs wireless communication with the base station 3 within the base station coverage area, in accordance with control by the TCU control section 110.

The short-range communication section 113 includes communication hardware according to a communication scheme such as Wi-Fi®, DSRC (Dedicated Short Range Communications), Bluetooth®, or C-V2X, and performs wireless communication with the access point 4 within the access point coverage area, in accordance with control by the TCU control section 110.

The vehicle-to-vehicle communication section 114 includes communication hardware according to a communication scheme such as Wi-Fi, DSRC, or C-V2X, and performs wireless communication with a TCU 11 included in another vehicle 1, in accordance with control by the TCU control section 110. The vehicle-to-vehicle communication section 114 performing wireless communication with a TCU 11 included in another vehicle 1 corresponds to the vehicle-to-vehicle communication section 114 performing wireless communication with another vehicle 1.

As described above, the TCU processor 1110 functions as the wide-area communication strength acquisition section 1111, the short-range communication strength acquisition section 1112, the area acquisition section 1113, and the communication control section 1114.

The wide-area communication strength acquisition section 1111 acquires a communication strength between the wide-area communication section 112 and the base station 3. A communication strength corresponds to a communication quality in the present invention. The communication strength refers to a strength of radio waves or an electric field between the wide-area communication section 112 and the base station 3. The wide-area communication strength acquisition section 1111 outputs the acquired communication strength to the communication control section 1114.

The short-range communication strength acquisition section 1112 acquires a communication strength between the short-range communication section 113 and the access point 4. The communication strength here is a strength of radio waves or an electric field between the short-range communication section 113 and the access point 4, and the strength is acquired, for example, as a value of electric power or RSSI. The short-range communication strength acquisition section 1112 outputs the acquired communication strength to the communication control section 1114.

The area acquisition section 1113 acquires a position and a range of the access point coverage area from map data 13A stored in the storage device 13, or the like. The area acquisition section 1113 outputs information indicating the acquired position and range of the access point coverage area to the communication control section 1114. The area acquisition section 1113 acquires a position and a range of the base station coverage area from the map data 13A stored in the storage device 13, or the like. The area acquisition section 1113 outputs information indicating the acquired position and range of the base station coverage area to the communication control section 1114.

The communication control section 1114 transmits upload data 6 to an outside of the vehicle 1 by using any one of the wide-area communication section 112, the short-range communication section 113, and the vehicle-to-vehicle communication section 114, based on whether or not an upload deferment condition is met, by performing operation according to a flowchart, which will be described later. The upload deferment condition is a condition of deferring transmission of upload data 6 performed by using the wide-area communication section 112. Details of the upload deferment condition will be described later with reference to FIG. 5.

The camera 12 captures data in each predetermined frame period in accordance with control by the vehicle control device 10, and outputs the captured data to the vehicle control device 10. The camera 12 is installed at a predetermined position in the vehicle 1 and captures an image outside of the vehicle 1.

The storage device 13 includes a non-volatile memory such as a hard disk, an EEPROM, or an SSD and stores data in a rewritable manner. The storage device 13 stores the map data 13A.

The map data 13A is data that stores road map information, facility information on various facilities, data for map matching, and the like. The road map information includes a road network in which roads on a map are represented by lines, and includes information related to links that are defined in such a manner that the road network is divided into a plurality of parts with intersections, forks, and the like serving as nodes, and portions between each node are defined as links. For each access point 4, the road map information includes a position (a longitude, a latitude) of the access point 4 and information indicating a range of the access point coverage area.

The vehicle speed sensor 14 detects the number of axle rotations per unit time period, and periodically acquires a vehicle speed of the vehicle 1, based on the detected number of rotations. The vehicle speed sensor 14 outputs vehicle speed data indicating the detected vehicle speed of the vehicle 1 to the vehicle control device 10 and the TCU 11.

The vehicle GPS 15 is a processing unit that receives GPS signals from GPS satellites via an antenna (not shown) and, based on the received GPS signals, calculates a position and a traveling direction of the vehicle 1. The vehicle GPS 15 generates position data indicating the position of the vehicle 1 and direction data indicating the traveling direction of the vehicle 1, and outputs the data to the vehicle control device 10 and the TCU 11.

Next, operation of the TCU 11 will be described.

Figure 4:
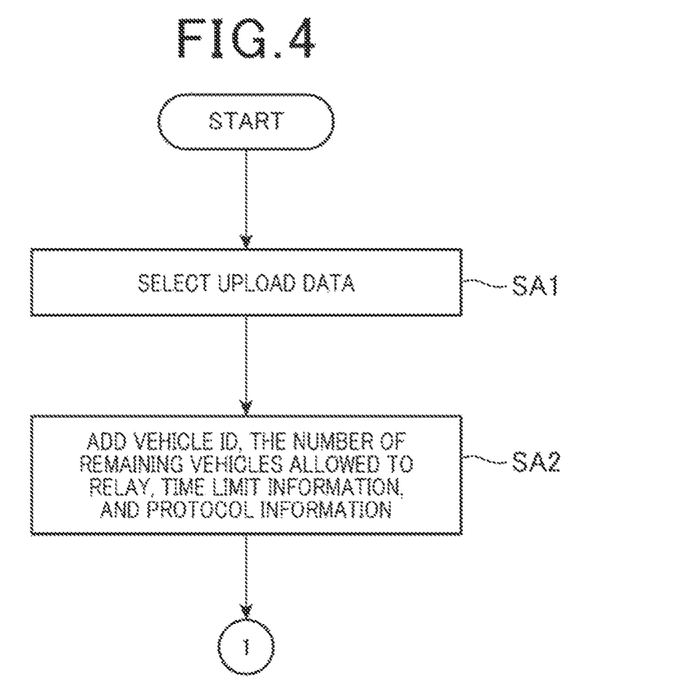
FIG. 4 is a flowchart showing operation of a TCU included in a vehicle that is a source of upload data.
Figure 5:
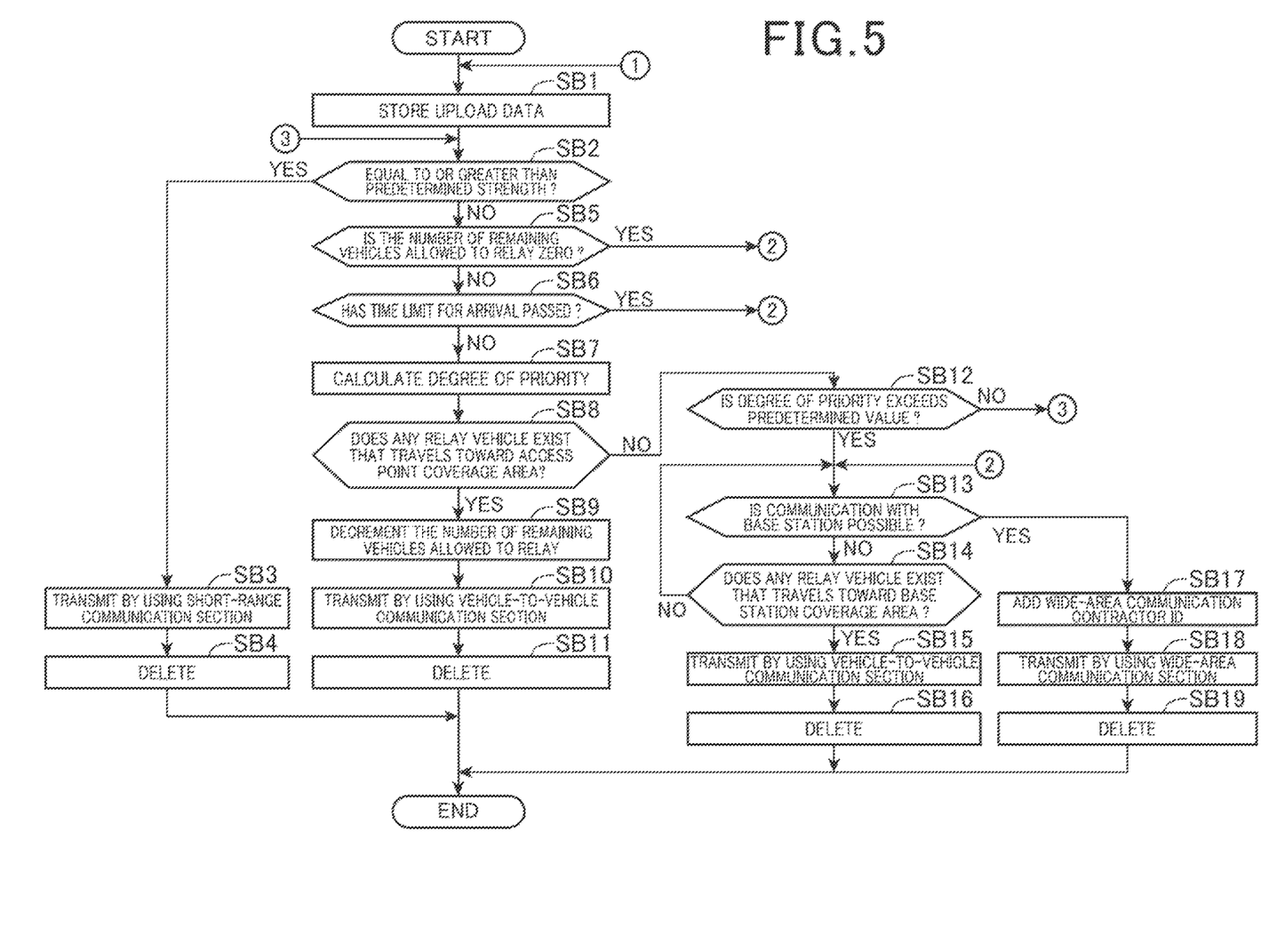
FIG. 5 is a flowchart showing operation of a TCU.

FIGS. 4 and 5 are flowcharts showing operation of the TCU 11. The operation shown in FIGS. 4 and 5 particularly show operation of the communication control section 1114.

FIG. 4 shows operation of a TCU 11 included in a vehicle 1 that is a source of upload data 6. FIG. 5 shows operation of the TCU 11 included in the vehicle 1 that is the source of the upload data 6, and of a TCU 11 that receives the upload data 6 from another vehicle 1.

In a description below, a vehicle 1 including a TCU 11 that performs the operation in FIG. 4 and/or FIG. 5 will be referred to as "subject vehicle". Moreover, in the description below, any vehicle 1, other than the subject vehicle, through which the upload data 6 can pass after starting from the subject vehicle and before arriving at the information processing server 2 will be referred to as "relay vehicle".

First, the operation performed by the TCU 11 included in the vehicle 1 that is the source of the upload data 6 will be described with reference to FIG. 4.

At a starting time point of the flowchart shown in FIG. 4, upload data 6 has been transmitted from the vehicle control device 10 to the TCU 11, and the upload data 6 is stored in the TCU storage section 1120.

The communication control section 1114 of the TCU 11 selects one piece of upload data 6 stored in the TCU storage section 1120 (step SA1).

When a plurality of pieces of upload data 6 are stored in the TCU storage section 1120, the communication control section 1114 selects one piece of upload data 6, for example, depending on a type of data to be transmitted, such as moving image data on an accident or image data on a parking lot.

The communication control section 1114 adds the vehicle ID 1122, the number of remaining vehicles allowed to relay, time limit information, and protocol information to the upload data 6 selected in step SA1 (step SA2).

The number of remaining vehicles allowed to relay refers to the number of remaining relay vehicles through which the upload data 6 is allowed pass before arriving at the information processing server 2. The number of remaining vehicles allowed to relay added to the upload data 6 in step SA2 may be varied according to a data volume of the upload data 6, a type of the upload data 6, or the like, or may be a fixed number.

The time limit information is information indicating a time limit for arrival of the upload data 6 at the information processing server 2. In step SA2, the communication control section 1114 sets a time a predetermined time period after a current time as a time limit for arrival, and adds time limit information indicating the time limit for arrival to the upload data 6. The predetermined time period added to the current time may be varied according to the data volume of the upload data 6, the type of the upload data 6, or the like, or may be a fixed time period.

The protocol information is information indicating any one of TCP and UDP as a communication protocol for the upload data 6. The communication protocol indicated by the protocol information may be varied according to the data volume of the upload data 6, the type of the upload data 6, or the like, or may be a fixed communication protocol. For example, when the upload data 6 is moving image data, the communication protocol indicated by the protocol information is UDP in order to implement high-speed communication.

After the communication control section 1114 adds the vehicle ID 1122, the number of remaining vehicles allowed to relay, the time limit information, and the protocol information to the upload data 6 in step SA2, the operation shown in FIG. 5 is performed.

Next, the operation of the TCU 11 included in each subject vehicle will be described with reference to FIG. 5.

The communication control section 1114 of the TCU 11 included in a subject vehicle stores, in the TCU storage section 1120, upload data 6 to which a vehicle ID 1122, the number of remaining vehicles allowed to relay, time limit information, and protocol information are added (step SB1).

In step SB1, when the subject vehicle is the vehicle 1 that is the source of the upload data 6, the communication control section 1114 stores, in the TCU storage section 1120, the upload data 6 to which the vehicle ID 1122, the number of remaining vehicles allowed to relay, the time limit information, and the protocol information are added in step SA2 of the flowchart shown in FIG. 4.

In step SB1, when the subject vehicle is a vehicle 1 other than the vehicle 1 that is the source of the upload data 6, the communication control section 1114 stores the upload data 6 received from another vehicle 1 in the TCU storage section 1120. The vehicle ID 1122, the number of remaining vehicles allowed to relay, the time limit information, and the protocol information are added to the upload data 6.

Hereinafter, the vehicle ID 1122, the number of remaining vehicles allowed to relay, the time limit information, and the protocol information are added to the upload data 6 to be processed in and after step SB2.

Subsequently, the communication control section 1114 determines whether or not a communication strength acquired by the short-range communication strength acquisition section 1112 is equal to or greater than a predetermined strength (step SB2). In other words, the communication control section 1114 determines whether or not the communication strength between the short-range communication section 113 and the access point 4 is equal to or greater than the predetermined strength. For the predetermined strength, a value at which the short-range communication section 113 can appropriately transmit upload data 6 to the access point 4 is predetermined through preliminary testing, simulation, or the like.

When it is determined that the communication strength acquired by the short-range communication strength acquisition section 1112 is equal to or greater than the predetermined strength (step SB2: YES), the communication control section 1114 transmits the upload data 6 by using the short-range communication section 113 (step SB3). Here, that the communication strength acquired by the short-range communication strength acquisition section 1112 is equal to or greater than the predetermined strength is an upload deferment condition.

Subsequently, the communication control section 1114 deletes the upload data 6 transmitted by using the short-range communication section 113, including the vehicle ID 1122, the number of remaining vehicles allowed to relay, the time limit information, and the protocol information added, from the TCU storage section 1120 (step SB4), and terminates the processing.

Referring back to step SB2, when it is determined that the communication strength acquired by the short-range communication strength acquisition section 1112 is less than the predetermined strength (step SB2: NO), the communication control section 1114 determines whether or not the number of remaining vehicles allowed to relay added to the upload data 6 is zero (step SB5). Here, "zero" corresponds to a predetermined number in the present invention.

When it is determined that the number of remaining vehicles allowed to relay is zero (step SB5: YES), the communication control section 1114 moves the processing to step SB13.

When it is determined that the number of remaining vehicles allowed to relay is not zero (step SB5: NO), the communication control section 1114 determines whether or not the time limit for arrival indicated by the time limit information added to the upload data 6 has passed (step SB6). Here, that the number of remaining vehicles allowed to relay is not zero, that is, that the number of remaining vehicles allowed to relay is larger than zero, is an upload deferment condition.

When it is determined that the time limit for arrival (step SB6: YES) has passed, the communication control section 1114 performs processing in step SB13.

When it is determined that the time limit for arrival (step SB6: NO) has not passed, the communication control section 1114 calculates a degree of priority for transmission performed by using the wide-area communication section 112 (step SB7). Here, that the time limit for arrival has not passed is an upload deferment condition.

Figure 6:
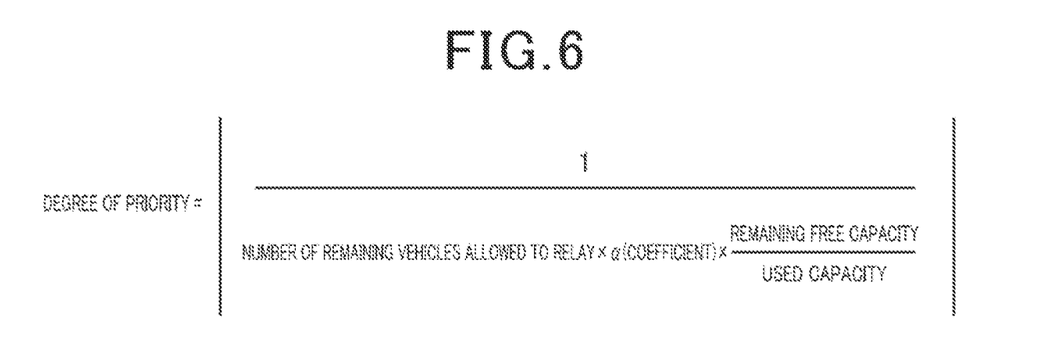
FIG. 6 shows an expression for calculating a degree of priority for transmission performed by using a wide-area communication section.

The calculation of the degree of priority is performed based on an expression shown in FIG. 6. A larger value calculated as the degree of priority indicates that a higher priority is placed on transmission performed by using the wide-area communication section 112.

FIG. 6 shows the expression for calculating the degree of priority.

The communication control section 1114 substitutes the number of remaining vehicles allowed to relay added to the upload data 6 into the expression shown in FIG. 6. According to the expression shown in FIG. 6, a higher degree of priority is obtained as the number of remaining vehicles allowed to relay is smaller.

The communication control section 1114 substitutes a used capacity of the TCU storage section 1120 and a remaining free capacity of the TCU storage section 1120 into the expression shown in FIG. 6. According to the expression shown in FIG. 6, a higher degree of priority is obtained as the used capacity is larger, that is, the remaining free capacity of the TCU storage section 1120 is smaller.

Note that the expression in FIG. 6 is only an example, and any expression may be used that produces a higher degree of priority as the number of remaining vehicles allowed to relay is smaller, and produces a higher degree of priority as the remaining free capacity of the TCU storage section 1120 is smaller.

The degree of priority may be determined only depending on the remaining free capacity of the TCU storage section 1120, and may take values that become larger as the remaining free capacity of the TCU storage section 1120 becomes smaller. The degree of priority may be determined only depending on the number of remaining vehicles allowed to relay, and may take values that become larger as the number of remaining vehicles allowed to relay becomes smaller.

Referring back to the flowchart shown in FIG. 5, after calculating the degree of priority, the communication control section 1114 determines whether or not any relay vehicle exists that arrives in the access point coverage area earlier than the own vehicle (step SB8).

In step SB8, the communication control section 1114 performs the determination, based on the position of the access point coverage area acquired by the area acquisition section 1113, the position and the traveling direction of the own vehicle calculated by the vehicle GPS 15, the speed of the own vehicle acquired by the vehicle speed sensor 14, and a position, a traveling direction, and a speed of a relay vehicle acquired by the camera 12 and the vehicle-to-vehicle communication section 114.

When it is determined that a relay vehicle exists that arrives in the access point coverage area earlier than the own vehicle (step SB8: YES), the communication control section 1114 decrements the number of remaining vehicles allowed to relay added to the upload data 6 by one (step SB9).

Subsequently, the communication control section 1114 transmits, to the TCU 11 included in the relay vehicle, the upload data 6 to which the number of remaining vehicles allowed to relay decremented by one is added, by using the vehicle-to-vehicle communication section 114 (step SB10).

Subsequently, the communication control section 1114 deletes the upload data 6 transmitted by using the vehicle-to-vehicle communication section 114, including the number of remaining vehicles allowed to relay, the time limit information, and the protocol information added, from the TCU storage section 1120 (step SB11), and terminates the processing.

Referring back to step SB8, when it is determined that no relay vehicle exists that arrives in the access point coverage area earlier than the own vehicle (step SB8: NO), the communication control section 1114 determines whether or not the degree of priority calculated in step SB7 exceeds a predetermined value (step SB12). The predetermined value is appropriately predetermined through preliminary testing, simulation, or the like.

If the degree of priority is a value that is determined only depending on the remaining free capacity of the TCU storage section 1120, the communication control section 1114 may determine in step SB12 whether or not the remaining free capacity of the TCU storage section 1120 is equal to or smaller than a predetermined capacity.

When it is determined that the degree of priority calculated in step SB7 is equal to or lower than the predetermined value (step SB12: NO), the communication control section 1114 moves the processing back to step SB2.

When it is determined that the degree of priority calculated in step SB7 exceeds the predetermined value (step SB12: YES), the communication control section 1114 determines, based on the communication strength acquired by the wide-area communication strength acquisition section 1111, whether or not communication with the base station 3 by using the wide-area communication section 112 is possible (step SB13).

When it is determined that communication with the base station 3 by using the wide-area communication section 112 is not possible (step SB13: NO), the communication control section 1114 determines whether or not any relay vehicle exists that arrives in the base station coverage area earlier than the own vehicle (step SB14).

In step SB14, the communication control section 1114 performs the determination, based on the position of the base station coverage area acquired by the area acquisition section 1113, the position and the traveling direction of the own vehicle calculated by the vehicle GPS 15, the speed of the own vehicle acquired by the vehicle speed sensor 14, and a position, a traveling direction, and a speed of a relay vehicle acquired by the camera 12 and the vehicle-to-vehicle communication section 114.

When it is determined that no relay vehicle exists that arrives in the base station coverage area earlier than the own vehicle (step SB14: NO), the communication control section 1114 performs the determination in step SB13 again.

When it is determined that a relay vehicle exists that arrives in the base station coverage area earlier than the own vehicle (step SB14: YES), the communication control section 1114 transmits the upload data 6 to the TCU 11 included in the relay vehicle by using the vehicle-to-vehicle communication section 114 (step SB15).

Subsequently, the communication control section 1114 deletes the upload data 6 transmitted by using the vehicle-to-vehicle communication section 114, including the vehicle ID 1122, the number of remaining vehicles allowed to relay, the time limit information, and the protocol information added, from the TCU storage section 1120 (step SB16), and terminates the processing.

Referring back to step SB13, when it is determined that communication with the base station 3 by using the wide-area communication section 112 is possible (step SB13: YES), the communication control section 1114 adds the wide-area communication contractor ID 1123 to the upload data 6 (step SB17).

Subsequently, the communication control section 1114 transmits the upload data 6 to which the wide-area communication contractor ID 1123 is added, by using the wide-area communication section 112 (step SB18).

The communication control section 1114 then deletes the upload data 6 transmitted by using the wide-area communication section 112, including the vehicle ID 1122, the number of remaining vehicles allowed to relay, the time limit information, and the protocol information added, from the TCU storage section 1120 (step SB19), and terminates the processing.

Hereinafter, the operation shown in FIGS. 4 and 5 will be described more specifically with reference to FIG. 1.

First, a description will be given of a case where the upload data 6 is transmitted to the information processing server 2 through the first path AK1 shown in FIG. 1.

The TCU 11A included in the vehicle 1A performs the operation in FIG. 4. Thereafter, the TCU 11A performs the operation in FIG. 5. In the operation in FIG. 5, the TCU 11A performs the processing in step SB5: YES, step SB13: YES, or performs the processing in step SB6: YES, step SB13: YES, or performs the processing in step SB12: YES, step SB13: YES, and then transmits the upload data 6 to the information processing server 2 via the base station 3, without transmitting the upload data 6 to any relay vehicle.

Next, a description will be given of a case where the upload data 6 is transmitted to the information processing server 2 through the second path AK2 shown in FIG. 1.

The TCU 11A included in the vehicle 1A performs the operation in FIG. 4. Thereafter, the TCU 11A performs the operation in FIG. 5. In the operation in FIG. 5, the TCU 11A performs the processing in step SB2: YES directly after step SB1 without going through any step, or performs the processing in step SB2: YES after going through steps in and after step SB5, and then transmits the upload data 6 to the information processing server 2 via the access point 4, without transmitting the upload data 6 to any relay vehicle.

Next, a description will be given of a case where the upload data 6 is transmitted to the information processing server 2 through the third path AK3 shown in FIG. 1.

The TCU 11A included in the vehicle 1A performs the operation in FIG. 4. Thereafter, the TCU 11A performs the operation in FIG. 5. In the operation in FIG. 5, the TCU 11A performs the processing in step SB8: YES, step SB9, step SB10, or performs the processing in step SB14: YES, step SB15, and then transmits the upload data 6 to the TCU 11B included in the vehicle 1B that is a relay vehicle.

The TCU 11B included in the TCU 11B that is a subject vehicle performs the operation in FIG. 5, triggered by reception of the upload data 6 from the vehicle 1A. In the operation in FIG. 5, the TCU 11B performs the processing in step SB8: YES, step SB9, step SB10, or performs the processing in step SB14: YES, step SB15, and then transmits the upload data 6 to the TCU 11C included in the vehicle 1C that is a relay vehicle.

The TCU 11C included in the vehicle 1C that is a subject vehicle performs the operation in FIG. 5, triggered by reception of the upload data 6 from the vehicle 1B. In the operation in FIG. 5, the TCU 11C performs the processing in step SB5: YES, step SB13: YES, or performs the processing in step SB6: YES, step SB13: YES, or performs the processing in step SB12: YES, step SB13: YES, and then transmits the upload data 6 to the information processing server 2 via the base station 3, without transmitting the upload data 6 to any relay vehicle.

Next, a description will be given of a case where the upload data 6 is transmitted to the information processing server 2 through the fourth path AK4 shown in FIG. 1.

The TCU 11A included in the vehicle 1A performs the operation in FIG. 4. Thereafter, the TCU 11A performs the operation in FIG. 5. In the operation in FIG. 5, the TCU 11A performs the processing in step SB8: YES, step SB9, step SB10, or performs the processing in step SB14: YES, step SB15, and then transmits the upload data 6 to the TCU 11B included in the vehicle 1B that is a relay vehicle.

The TCU 11B included in the vehicle 1B that is a subject vehicle performs the operation in FIG. 5, triggered by reception of the upload data 6 from the vehicle 1A. In the operation in FIG. 5, the TCU 11B performs the processing in step SB8: YES, step SB9, step SB10, or performs the processing in step SB14: YES, step SB15, and then transmits the upload data 6 to the TCU 11D included in the vehicle 1D that is a relay vehicle.

The TCU 11D included in the vehicle 1D that is a subject vehicle performs the operation in FIG. 5, triggered by reception of the upload data 6 from the vehicle 1B. In the operation in FIG. 5, the TCU 11D performs the processing in step SB2: YES directly after step SB1 without going through any step, or performs the processing in step SB2: YES after going through steps in and after step SB5, and then transmits the upload data 6 to the information processing server 2 via the access point 4, without transmitting the upload data 6 to any relay vehicle.

Next, modification examples will be described.

In a modification example, when the TCU storage section 1120 stores a plurality of pieces of upload data 6, the communication control section 1114 of the TCU 11 of a subject vehicle determines, in parallel for all the pieces of upload data 6, whether or not an upload deferment condition is met. Note that a vehicle ID 1122, the number of remaining vehicles allowed to relay, time limit information, and protocol information are added to each of the plurality of pieces of upload data 6 stored in the TCU storage section 1120. When there are a plurality of pieces of upload data 6 for which positive determination is made in step SB13, the communication control section 1114 transmits the plurality of pieces of upload data 6 in ascending order of data volume, by using the wide-area communication section 112. While the plurality of pieces of upload data 6 are transmitted in ascending order of data volume, the communication control section 1114 determines again, in parallel for all the pieces of upload data 6, whether or not the upload deferment condition is met.

Thus, when the subject vehicle becomes located in the access point coverage area while the plurality of pieces of upload data 6 are transmitted by using the wide-area communication section 112, upload data 6 with a larger data volume can be transmitted by using the short-range communication section 113. Accordingly, data upload from the vehicle 1 to the information processing server 2 can be carried out quickly while an increase in a data volume communicated with the base station 3 is further restrained.

As described hereinabove, the TCU 11 used in a subject vehicle includes: the wide-area communication section 112 that performs wireless communication with the base station 3 within the base station coverage area; the short-range communication section 113 that performs wireless communication with the access point 4 within the access point coverage area that has a shorter range than the base station coverage area; the vehicle-to-vehicle communication section 114 that performs wireless communication with a relay vehicle other than the subject vehicle; and the communication control section 1114 that transmits, by using any one of the wide-area communication section 112, the short-range communication section 113, and the vehicle-to-vehicle communication section 114, upload data 6 for which the information processing server 2 is specified as an upload destination. The communication control section 1114 transmits the upload data 6 more preferentially by using the short-range communication section 113 or the vehicle-to-vehicle communication section 114 than by using the wide-area communication section 112 when a predetermined upload deferment condition is met with respect to the upload data 6, and transmits the upload data 6 more preferentially by using the wide-area communication section 112 than by using the short-range communication section 113 and the vehicle-to-vehicle communication section 114 when the upload deferment condition is not met.

Moreover, in a communication method performed by the TCU 11, when a predetermined upload deferment condition is met with respect to upload data 6 for which the information processing server 2 is specified as an upload destination, the upload data 6 is transmitted more preferentially by using the short-range communication section 113 or the vehicle-to-vehicle communication section 114 than by using the wide-area communication section 112, and when the upload deferment condition is not met, the upload data 6 is transmitted more preferentially by using the wide-area communication section 112 than by using the short-range communication section 113 and the vehicle-to-vehicle communication section 114.

The communication program 1121 causes the TCU control section 110 of the TCU 11 to function as the communication control section 1114 that, when a predetermined upload deferment condition is met with respect to upload data 6 for which the information processing server 2 is specified as an upload destination, transmits the upload data 6 more preferentially by using the short-range communication section 113 or the vehicle-to-vehicle communication section 114 than by using the wide-area communication section 112, and when the upload deferment condition is not met, transmits the upload data 6 more preferentially by using the wide-area communication section 112 than by using the short-range communication section 113 and the vehicle-to-vehicle communication section 114.

The vehicle 1 includes the above-described TCU 11.

According to the TCU 11, the communication method, the communication program 1121, and the vehicle 1, when upload of upload data 6 can be deferred, the upload data 6 is transmitted more preferentially by using the short-range communication section 113 or the vehicle-to-vehicle communication section 114 than by using the wide-area communication section 112, and when upload of the upload data 6 cannot be deferred, the upload data 6 is transmitted more preferentially by using the wide-area communication section 112 than by using the short-range communication section 113 and the vehicle-to-vehicle communication section 114. Accordingly, the TCU 11, the communication method, the communication program 1121, and the vehicle 1 enable data upload from the vehicle 1 to the information processing server 2 to be carried out quickly, while restraining an increase in a data volume communicated with the base station 3.

The TCU 11 includes the TCU storage section 1120 that stores upload data 6. The communication control section 1114 transmits the upload data 6 stored in the TCU storage section 1120 by using any one of the wide-area communication section 112, the short-range communication section 113, and the vehicle-to-vehicle communication section 114, and after the transmission, deletes the upload data 6 from the TCU storage section 1120.

According to such a configuration, since a storage area of the TCU storage section 1120 can be increased after upload data 6 is transmitted, a storage area for storing new upload data 6 can be secured when the new upload data 6 is intended to be uploaded to the information processing server 2. Accordingly, a situation can be prevented where the TCU storage section 1120 cannot store new upload data 6, and consequently the TCU 11 cannot upload the upload data 6 to the information processing server 2. Thus, data upload from the vehicle 1 to the information processing server 2 can be carried out reliably.

When the remaining free capacity of the TCU storage section 1120 is equal to or smaller than the predetermined capacity, the communication control section 1114 transmits upload data 6 more preferentially by using the wide-area communication section 112 than by using the short-range communication section 113 and the vehicle-to-vehicle communication section 114 even if an upload deferment condition is met.

According to such a configuration, even if upload of upload data 6 can be deferred, the upload data 6 is transmitted more preferentially by using the wide-area communication section 112 than by using the short-range communication section 113 and the vehicle-to-vehicle communication section 114 when the remaining free capacity of the TCU storage section 1120 is equal to or smaller than the predetermined capacity. Accordingly, a situation can be prevented where the TCU storage section 1120 cannot store new upload data 6, and consequently the TCU 11 cannot upload the upload data 6 to the information processing server 2. Thus, data upload from the vehicle 1 to the information processing server 2 can be carried out reliably and quickly.

The number of remaining vehicles allowed to relay, which indicates the number of remaining relay vehicles through which upload data 6 is allowed to pass before arriving at the information processing server 2, is added to the upload data 6. When the upload data 6 is transmitted by using the vehicle-to-vehicle communication section 114, the communication control section 1114 decrements the number of remaining vehicles allowed to relay added to the upload data 6. An upload deferment condition is that the number of remaining vehicles allowed to relay is equal to or larger than the predetermined number.

According to such a configuration, when the number of remaining vehicles allowed to relay is equal to or larger than the predetermined number, upload data 6 is transmitted by using the short-range communication section 113 or the vehicle-to-vehicle communication section 114, and when the number of remaining vehicles allowed to relay is smaller than the predetermined number, the upload data 6 is transmitted by using the wide-area communication section 112. Accordingly, a situation can be prevented where upload data 6 is not uploaded to the information processing server 2 over a long time period. Thus, data upload from the vehicle 1 to the information processing server 2 can be carried out reliably.

Time limit information, which indicates a time limit for arrival of upload data 6 at the information processing server 2, is added to the upload data 6. An upload deferment condition is that the time limit for arrival indicated by the time limit information added to the upload data 6 has not passed.

According to such a configuration, when a time limit for arrival has not passed, upload data 6 is transmitted by using the short-range communication section 113 or the vehicle-to-vehicle communication section 114, and when the time limit for arrival has passed, the upload data 6 is transmitted by using the wide-area communication section 112. Accordingly, a situation can be prevented where upload data 6 is not uploaded to the information processing server 2 over a long time period. Thus, data upload from the vehicle 1 to the information processing server 2 can be carried out reliably.

The TCU 11 includes the short-range communication strength acquisition section 1112 that acquires a communication strength of the short-range communication section 113. An upload deferment condition is that the communication strength acquired by the short-range communication strength acquisition section 1112 is equal to or greater than the predetermined strength. When the communication strength acquired by the short-range communication strength acquisition section 1112 is equal to or greater than the predetermined strength, the communication control section 1114 transmits upload data 6 by using the short-range communication section 113.

According to such a configuration, since upload data 6 is transmitted by using the short-range communication section 113 when the communication strength of the short-range communication section is equal to or greater than the predetermined strength, use of transmission by using the vehicle-to-vehicle communication section 114 and transmission by using the wide-area communication section 112 can be reduced. Accordingly, data upload from the vehicle 1 to the information processing server 2 can be carried out quickly while an increase in a data volume communicated with the base station 3 is further restrained.

When upload data 6 is transmitted by using the wide-area communication section 112, the communication control section 1114 adds the wide-area communication contractor ID 1123 to the upload data 6 and then transmits the upload data 6.

According to such a configuration, the information processing server 2 can identify a wide-area communication contractor who uploads upload data 6 to the information processing server 2 by using the wide-area communication section 112. Accordingly, an entity that manages the information processing server 2 can recognize whether a vehicle 1 of a wide-area communication contractor uploads upload data 6 originated from the own vehicle, or uploads upload data 6 originated from another vehicle 1. Thus, an action such as a return of communication costs can be easily taken.

When there are a plurality of pieces of upload data 6 to be transmitted by using the wide-area communication section 112, the communication control section 1114 transmits the plurality of pieces of upload data 6 in ascending order of data volume.

According to such a configuration, when a subject vehicle becomes located in the access point coverage area while a plurality of pieces of upload data 6 are transmitted by using the wide-area communication section 112, upload data 6 with a larger data volume can be transmitted by using the short-range communication section 113. Accordingly, data upload from the vehicle 1 to the information processing server 2 can be carried out quickly while an increase in a data volume communicated with the base station 3 is further restrained.

The TCU 11 includes the area acquisition section 1113 that acquires the position of the access point coverage area. The communication control section 1114 transmits upload data 6, by using the vehicle-to-vehicle communication section 114, to a relay vehicle traveling toward the position of the access point coverage area acquired by the area acquisition section 1113.

According to such a configuration, since upload data 6 can be transmitted to a relay vehicle by which the upload data 6 can be uploaded more quickly, data upload from the vehicle 1 to the information processing server 2 can be carried out more quickly while an increase in a data volume communicated with the base station 3 is further restrained.

Note that the present invention is not limited to the embodiment and the modification examples, and can be worked in various aspects within a scope that does not depart from the principles of the present invention.

For example, in the above-described embodiment and modification examples, the TCU 11 is illustrated as the communication device of the present invention. However, the communication device of the present invention is not limited to the TCU 11, and may be a terminal device, such as a smartphone, owned by an occupant of the vehicle 1.

For example, in the above-described embodiment and modification examples, the case is illustrated where the area acquisition section 1113 acquires the position and the range of the access point coverage area and the position and the range of the base station coverage area from the map data 13A. However, a source from which the area acquisition section 1113 acquires such information is not limited to the map data 13A, and may be a predetermined database or a predetermined server.

For example, in the above-described embodiment and modification examples, the case is illustrated where the wide-area communication contractor ID 1123 is added when upload data 6 is uploaded by using the wide-area communication section 112. However, the vehicle ID 1122 may be added, instead of the wide-area communication contractor ID 1123.

For example, the vehicle 1 may be a vehicle that can be manually driven, which travels with a driver performing driving-related operations, or may be a vehicle capable of automatic driving, which travels without a driver performing driving-related operations. For example, the vehicle 1 is a vehicle such as an engine-driven four-wheeled vehicle, a motor-driven electric vehicle, or a hybrid vehicle equipped with a motor and an engine. The vehicle 1 may be a vehicle other than a four-wheeled vehicle.

For example, in the above-described embodiment, the blocks shown in FIGS. 2 and 3 are schematic diagrams in which constitutional elements are classified and shown according to main processing contents, in order to facilitate understanding of the invention of the present application, and the blocks may be classified into further more constitutional elements according to processing contents. Classification may be made such that one constitutional element performs further more processing.

For example, the units of steps in the operation shown in FIGS. 4 and 5 are units divided according to main processing contents, in order to facilitate understanding of the operations of the TCU 11, and the present invention is not limited by a manner in which units of processing are divided, or by names of the units of processing. The units of steps may be divided into further more units of steps according to processing contents. Division may be made such that one unit of a step includes further more processing. The order of the steps may be appropriately interchanged within a scope that does not compromise the principles of the present invention.

The TCU processor 1110 may function as a TCU control section 110, a TCU NW communication section 111, a wide-area communication section 112, a short-range communication section 113, and a vehicle-to-vehicle communication section 114, by reading and executing a communication program 1121 stored in the TCU storage section 1120.

REFERENCE SIGNS LIST 1, 1A, 1B, 1C, 1D . . . vehicle, 2 . . . information processing server (predetermined server), 3 . . . base station, 4 . . . access point, 6 . . . upload data, 11, 11A, 11B, 11C, 11D . . . TCU (communication device), 110 . . . TCU control section (control section), 112 . . . wide-area communication section, 113 . . . short-range communication section, 114 . . . vehicle-to-vehicle communication section, 1112 . . . short-range communication strength acquisition section (communication quality acquisition section), 1113 . . . area acquisition section, 1114 . . . communication control section, 1120 . . . TCU storage section (storage section), 1121 . . . communication program, 1123 . . . wide-area communication contractor ID (identification information on a contractor signing a contract for communication performed by using the wide-area communication section).

What is claimed is:

1. A communication device used in a subject vehicle, the communication device comprising:
 a processor;
 a wide-area communication section having a first receiver and a first transmitter, and that performs wireless communication with a base station within a first communication area;
 a short-range communication section having a second receiver and a second transmitter, and that performs wireless communication with an access point within a second communication area that has a shorter range than the first communication area; and
 a vehicle-to-vehicle communication section having a third receiver and a third transmitter, and that performs wireless communication with a relay vehicle other than the subject vehicle, wherein
 the processor transmits, by using any one of the wide-area communication section, the short-range communication section, and the vehicle-to-vehicle communication section, upload data for which a predetermined server having a server processor is specified as an upload destination,
 time limit information is added to the upload data, the time limit information indicating a time limit for arrival of the upload data at the predetermined server,
 the processor transmits the upload data by using the short-range communication section or the vehicle-to-vehicle communication section without using the wide-area communication section when a current time is prior to a time indicating the time limit for arrival indicated by the time limit information added to the upload data, and
the processor transmits the upload data by using the wide-area communication section when the current time has passed the time indicating the time limit for arrival indicated by the time limit information added to the upload data.

2. The communication device according to claim 1, further comprising a memory that stores the upload data,
wherein the processor transmits the upload data stored in the memory by using any one of the wide-area communication section, the short-range communication section, and the vehicle-to-vehicle communication section, and after the transmission, deletes the upload data from the memory.

3. The communication device according to claim 2, wherein the processor transmits the upload data by using the wide-area communication section when a remaining free capacity of the memory is equal to or smaller than a predetermined capacity.

4. The communication device according to claim 1, wherein
the number of remaining vehicles allowed to relay is added to the upload data, the number of remaining vehicles allowed to relay indicating the number of the remaining relay vehicles through which the upload data is allowed to pass before arriving at the predetermined server,
the processor decrements the number of remaining vehicles allowed to relay added to the upload data when the upload data is transmitted by using the vehicle-to-vehicle communication section, and
transmits the upload data by using the short-range communication section or the vehicle-to-vehicle communication section without using the wide-area communication section when the number of remaining vehicles allowed to relay is equal to or larger than a predetermined number.

5. The communication device according to claim 1, wherein the processor of the communication device further acquires a communication quality of the short-range communication section, and
when the communication quality acquired is equal to or higher than a predetermined quality,
the processor transmits the upload data by using the short-range communication section.

6. The communication device according to claim 1, wherein when the upload data is transmitted by using the wide-area communication section, the processor adds identification information of a contractor to the upload data and transmits the upload data, the contractor signing a contract for communication performed by using the wide-area communication section.

7. The communication device according to claim 1, wherein when there are a plurality of pieces of the upload data to be transmitted by using the wide-area communication section, the processor transmits the plurality of pieces of the upload data in ascending order of data volume.

8. The communication device according to claim 1, wherein the processor of the communication device further acquires a position of the second communication area, and
transmits the upload data, by using the vehicle-to-vehicle communication section, to the relay vehicle traveling toward the position of the second communication area acquired.

9. A vehicle comprising the communication device according to claim 1.

10. A communication method performed by a communication device used in a subject vehicle, the communication device having
a processor;
a wide-area communication section having a first receiver and a first transmitter, and that performs wireless communication with a base station within a first communication area;
a short-range communication section having a second receiver and a second transmitter, and that performs wireless communication with an access point within a second communication area that has a shorter range than the first communication area; and
a vehicle-to-vehicle communication section having a third receiver and a third transmitter, and that performs wireless communication with a relay vehicle other than the subject vehicle, wherein
the processor transmits, by using any one of the wide-area communication section, the short-range communication section, and the vehicle-to-vehicle communication section, upload data for which a predetermined server having a server processor is specified as an upload destination,
time limit information is added to the upload data, the time limit information indicating a time limit for arrival of the upload data at the predetermined server,
the processor, when a current time is prior to a time indicating the time limit for arrival indicated by the time limit information added to the upload data, transmits the upload data by using the short-range communication section or the vehicle-to-vehicle communication section without using the wide-area communication section, and
the processor, when the current time has passed the time indicating the time limit for arrival indicated by the time limit information added to the upload data, transmits the upload data by using the wide-area communication section.

11. A non-transitory computer-readable storage medium storing a communication program for a communication device used in a subject vehicle, the communication device having
a processor;
a wide-area communication section having a first receiver and a first transmitter, and that performs wireless communication with a base station within a first communication area;
a short-range communication section having a second receiver and a second transmitter, and that performs wireless communication with an access point within a second communication area that has a shorter range than the first communication area; and
a vehicle-to-vehicle communication section having a third receiver and a third transmitter, and that performs wireless communication with a relay vehicle other than the subject vehicle, the communication program causes the processor of the communication device to
transmit, by using any one of the wide-area communication section, the short-range communication section, and the vehicle-to-vehicle communication section, upload data for which a predetermined server having a server processor is specified as an upload destination, wherein time limit information is added to the upload data, the time limit information indicating a time limit for arrival of the upload data at the predetermined server, the communication program further causes the processor of the communication device to, when a current time is prior to a time indicating the time limit for arrival indicated by the time limit information added to the upload data, transmit the upload data by using the short-range communication section or the vehicle-to-vehicle communication section without using the wide-area communication section, and when the current time has passed the time indicating the time limit for arrival indicated by the time limit information added to the upload data, transmit the upload data by using the wide-area communication section.

\* \* \* \* \*